United States Patent
Aoki et al.

(10) Patent No.: US 9,990,945 B2
(45) Date of Patent: Jun. 5, 2018

(54) SUSPENSION ASSEMBLY WITH LIFT TAB FOR DISK DRIVE, DISK DRIVE WITH THE SAME

(71) Applicant: Kabushiki Kaisha Toshiba, Minato-ku, Tokyo (JP)

(72) Inventors: Kenichiro Aoki, Machida Tokyo (JP); Yasutaka Sasaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/459,604

(22) Filed: Mar. 15, 2017

(65) Prior Publication Data
US 2017/0309303 A1 Oct. 26, 2017

Related U.S. Application Data

(60) Provisional application No. 62/326,873, filed on Apr. 25, 2016.

(51) Int. Cl.
*G11B 5/48* (2006.01)
*G11B 5/10* (2006.01)

(52) U.S. Cl.
CPC ............ *G11B 5/4826* (2013.01); *G11B 5/102* (2013.01)

(58) Field of Classification Search
CPC .............................. G11B 5/4826; G11B 5/102
See application file for complete search history.

(56) References Cited

U.S. PATENT DOCUMENTS

| | | | |
|---|---|---|---|
| 4,083,221 A | 4/1978 | Whitted | |
| 5,526,950 A | 6/1996 | Tago et al. | |
| 5,862,018 A * | 1/1999 | Vera | G11B 5/484 360/255.9 |
| 5,864,448 A * | 1/1999 | Berberich | G11B 5/54 360/254.8 |
| 6,151,197 A * | 11/2000 | Larson | G11B 21/16 360/244.2 |
| 6,181,529 B1 | 1/2001 | Aoyagi et al. | |
| 6,268,982 B1 * | 7/2001 | McGrath | G11B 5/54 360/133 |
| 6,407,889 B1 * | 6/2002 | Khan | G11B 5/54 360/255 |
| 6,483,670 B1 * | 11/2002 | Watanabe | G11B 5/4826 360/245.7 |

(Continued)

FOREIGN PATENT DOCUMENTS

JP 2877962 B2 4/1999

*Primary Examiner* — Brian Miller
(74) *Attorney, Agent, or Firm* — White & Case LLP

(57) ABSTRACT

According to one embodiment, a suspension assembly includes a support plate and a lift tab extending in a first direction. The lift tab has an arc-shaped cross section, and includes an arc-shaped outer circumferential surface, an arc-shaped inner circumferential surface, a first upper end surface located between one arc ends of the outer and inner circumferential surfaces, and a second upper end surface located between other arc ends of the outer and inner circumferential surfaces of the inner circumferential surface, and a first angle made between the outer circumferential surface and the first upper end surface is less than a second angle made between the inner circumferential surface and the first upper end surface.

10 Claims, 8 Drawing Sheets

(56) References Cited

U.S. PATENT DOCUMENTS

| | | | | |
|---|---|---|---|---|
| 6,611,402 | B1* | 8/2003 | Mangold | G11B 5/4826 360/245.7 |
| 7,085,104 | B1* | 8/2006 | Hadian | G11B 5/4826 360/245.7 |
| 7,137,187 | B2* | 11/2006 | Pan | G11B 5/484 29/603.03 |
| 7,558,023 | B2* | 7/2009 | Ohwe | G11B 5/54 360/245.3 |
| 7,558,024 | B2* | 7/2009 | Tada | G11B 5/54 360/255 |
| 7,609,483 | B2* | 10/2009 | Deguchi | G11B 5/4833 360/254.7 |
| 7,706,106 | B1* | 4/2010 | Mei | G11B 5/4833 360/254.6 |
| 7,724,476 | B1* | 5/2010 | Bjorstrom | G11B 5/4833 360/244.2 |
| 7,733,608 | B2* | 6/2010 | Ueno | G11B 5/4826 360/254.8 |
| 7,804,664 | B1* | 9/2010 | Tokuda | G11B 5/54 360/254.6 |
| 8,817,424 | B1 | 8/2014 | Hardy et al. | |
| 8,976,491 | B1* | 3/2015 | Chen | G11B 5/4833 360/245.7 |
| 2004/0027725 | A1* | 2/2004 | Pan | G11B 5/484 360/245.3 |
| 2005/0030671 | A1* | 2/2005 | Lee | G11B 5/4826 360/255 |
| 2005/0174694 | A1* | 8/2005 | Erpelding | G11B 5/4833 360/244.8 |

* cited by examiner

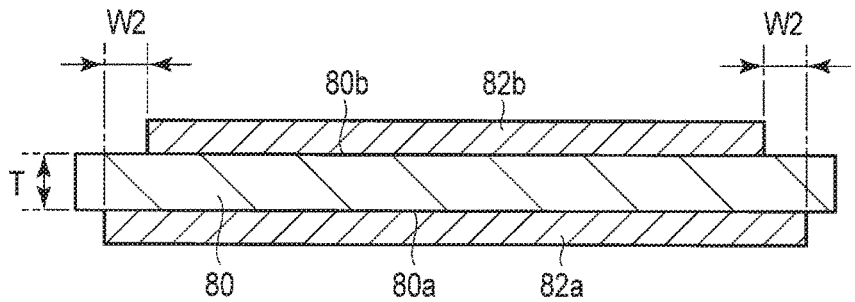
F I G. 11
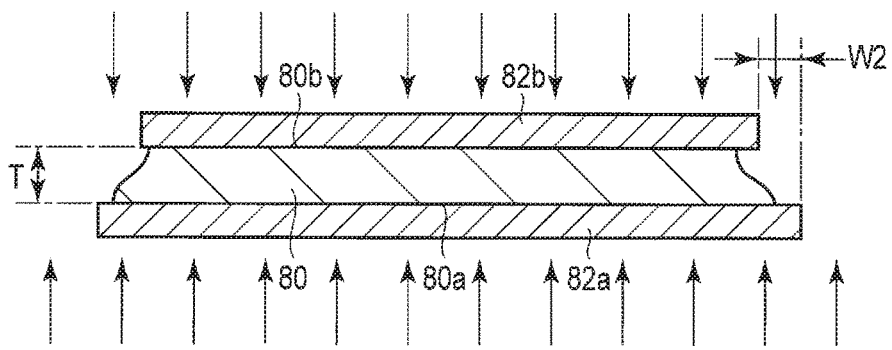
F I G. 12
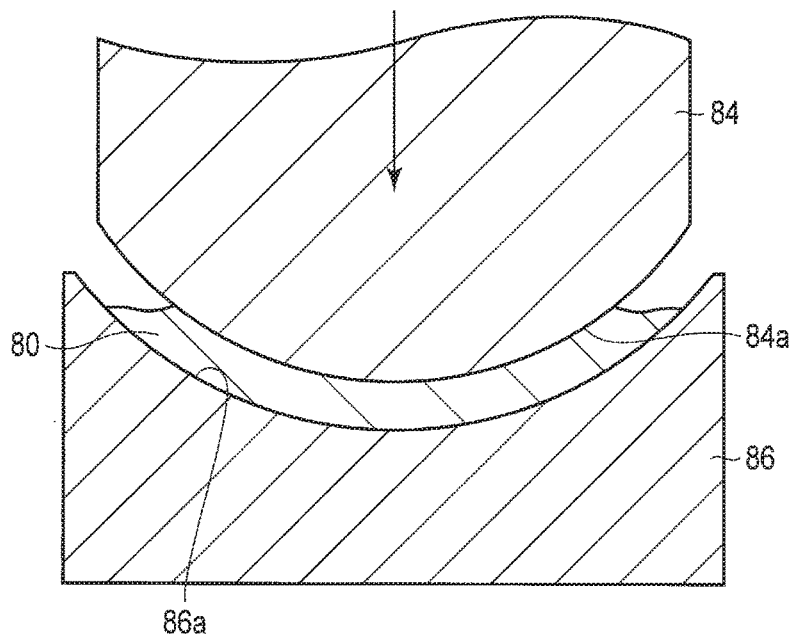
F I G. 13

SUSPENSION ASSEMBLY WITH LIFT TAB FOR DISK DRIVE, DISK DRIVE WITH THE SAME

CROSS-REFERENCE TO RELATED APPLICATIONS

This application claims the benefit of U.S. Provisional Application No. 62/326,873, filed Apr. 25, 2016, the entire contents of which are incorporated herein by reference.

FIELD

Embodiments described herein relate generally to a suspension assembly with a lift tab, a disk drive with the same and a method of manufacturing a lift tab of a suspension assembly.

BACKGROUND

Hard disk drives (HDD), one type of disk drives, generally comprise a housing, a magnetic disk accommodated in the housing, a magnetic head which read/write data with respect to the magnetic disk, and a suspension assembly which movably supports the magnetic head. Further, HDDs comprise a ramp member which holds the magnetic head in a position away from the magnetic disk when the magnetic head moves to the outer circumferential edge of the magnetic disk.

The suspension assembly includes a suspension attached to a distal end of an arm and a load beam extending from the suspension, and the magnetic head is supported on a distal end of the load beam through a gimbal portion. Further, a lift tab is provided at a tip of the load beam.

The lift tab is a long and slender tab having substantially a semi-circular sectional shape, and holds the magnetic head in an unloading position as its outer circumferential surface of the lift tab climb up on the ramp member while contacting thereto. As such a lift tab, there has been proposed a type with enhanced rigidity by reducing the radius of the tab in its outer side as compared to its central portion. With this configuration, deformation of the lift tab, which may occur when the head is unloaded, i.e., when the tab climbs up on the ramp, can be suppressed.

The lift tab of the above-described configuration has enhanced rigidity, however, it entails a drawback of increasing the thickness (height) of the lift tab.

BRIEF DESCRIPTION OF THE DRAWINGS

FIG. 8 is an enlarged perspective view showing the lift tab of the suspension assembly.

FIG. 11 is a cross sectional view of the lift tab, which illustrates a manufacturing process thereof.

FIG. 12 is a cross sectional view of the lift tab, which illustrates an etching step thereof.

FIG. 13 is a cross sectional view of the lift tab, which illustrates a coining step thereof.

DETAILED DESCRIPTION

Figure 1:
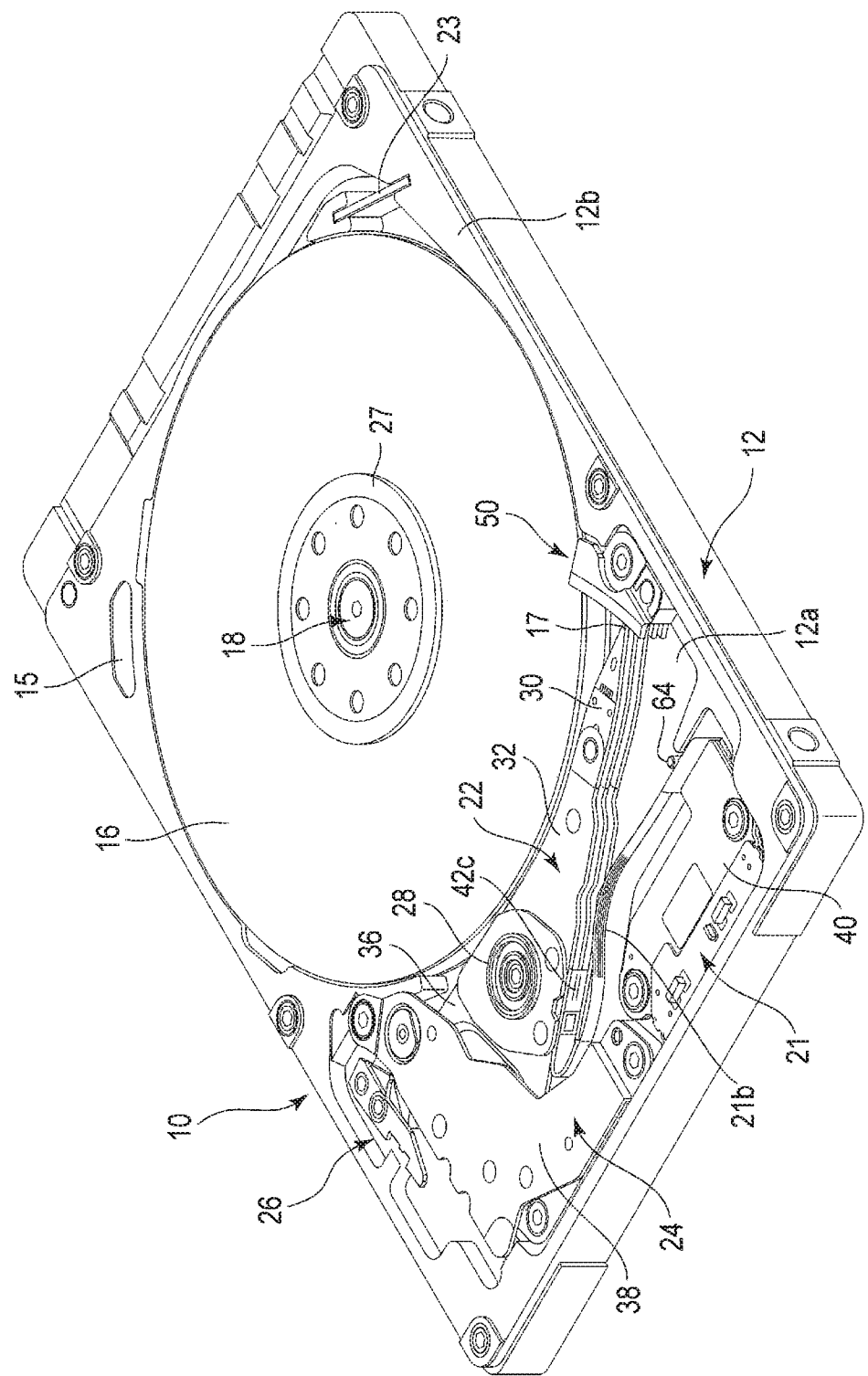
FIG. 1 is a perspective diagram showing an internal structure of a hard disk drive (HDD) according to an embodiment.

Various embodiments will be described hereinafter with reference to the accompanying drawings. In general, according to one embodiment, a suspension assembly for a disk drive, comprises a support plate including a distal end and a lift tab extending in a first direction from the distal end of the support plate. The lift tab is formed to have an arc-shaped lateral cross section orthogonally crossing the first direction, and include an arc-shaped outer circumferential surface, an arc-shaped inner circumferential surface, a first upper end surface located between one arc end of the outer circumferential surface and one arc end of the inner circumferential surface, and a second upper end surface located between an other arc end of the outer circumferential surface and an other arc end of the inner circumferential surface. A first angle made between the outer circumferential surface and the first upper end surface is less than a second angle made between the inner circumferential surface and the first upper end surface.

Hereinafter, a hard disk drive (HDD) according to an embodiment as an example of the disk drive will be described in detail.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 shows an internal structure of an HDD according to an embodiment. As shown in FIG. 1, the HDD comprises a housing 10. The housing 10 comprises a rectangular box-shaped base 12 whose upper surface is opened and a top cover (not shown) which closes the upper end opening of the base 12. The base 12 comprises a rectangular bottom wall 12a and a side wall 12b provided to stand along a circumferential edge of the bottom wall 12a.

In the housing 10, arranged are two magnetic disks 16 as recording media, and a spindle motor 18 provided as a driving section which supports and rotates the magnetic disks 16. The spindle motor 18 is disposed on the bottom wall 12a. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12. The magnetic disks 16 are rotated at a predetermined speed by the spindle motor 18.

A plurality of magnetic heads 17 and a head stack assembly (hereinafter referred to as an HSA) 22 are accommodated in the housing 10. The magnetic heads 17 are configured to write and read data on and from the magnetic disks 16, and the HSA 22 supports the magnetic heads 17 such that they are movable with respect to the magnetic disks 16. Further, in the housing 10, arranged are a voice coil motor (VCM) 24, a ramp member 50, a latch mechanism 26 and a board unit 21. The VCM 24 rotates and positions the HSA 22, the ramp member 50 holds the magnetic heads 17 in unload positions where they are separated from the magnetic disks 16, when the magnetic heads 17 are moved to outermost circumferential part of the magnetic disks 16, the latch mechanism 26 holds the HSA in a retreat position when an impact or the like acts on the HDD, and the board unit 21 comprises a conversion connector, etc.

A printed circuit board (not shown) is fixed by screws to an outer surface of the bottom wall 12a of the base 12. The printed circuit board controls operations of the spindle motor 18, the VCM 24 and the magnetic heads 17 through the board unit 21. A circulation filter 23 configured to capture dust caused in the housing 10 is provided on the side wall 12b of the base 12, and is positioned on outer sides of the magnetic disks 16. Further, a breather filter 15 configured to capture dust from the air flowing into the housing 10 is provided on the side wall 12b.

As shown in FIG. 1, the HSA 22 comprises a rotatable bearing unit 28, four arms 32 attached to the bearing unit 28 in a stacked state, suspension assemblies 30 respectively extending out from the arms 32, and spacer rings (not shown) provided between the arms 32 arranged in the stacked state. Each of the arms 32 is formed of, for example, stainless steel, aluminum or the like into an elongate and thin plate-shape. Each arm 32 comprises a distal end portion at its extended end side. At the distal end portion, a caulking seating face having a caulking hole (not shown) is formed.

Figure 2:
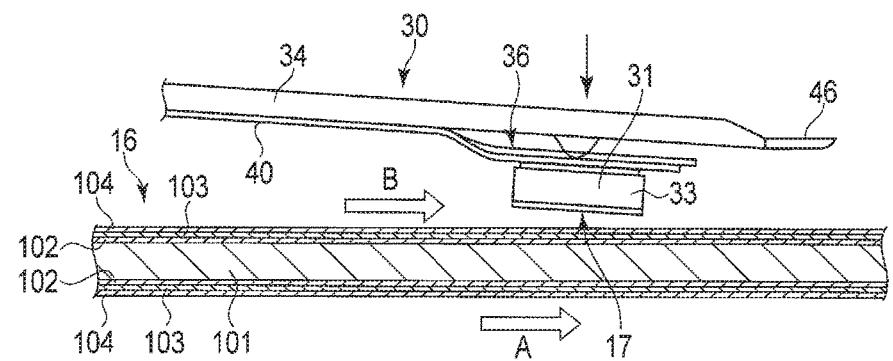
FIG. 2 is an expanded side view showing a magnetic disk, a magnetic head and a suspension in the HDD.

FIG. 2 schematically shows the magnetic head in a flying state and the magnetic disks. As illustrated in FIGS. 1 and 2, the magnetic disk 16 comprises, for example, a discoidal non-magnetic substrate 101 having a diameter of about 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material exhibiting a soft magnetic characteristic.

As shown in FIG. 2, each of the magnetic heads 17 is formed as a flying type head, and comprises a slider 31 formed in a substantially rectangular parallelepiped shape, and a head section 33 formed in an outflow end (trailing) side of the slider. Each magnetic head 17 is supported on a distal end portion of the respective suspension assembly 30 by a gimbal portion 36 of a flexure, which will be described later. Each magnetic head 17 is flied by airflow B which is generated between a surface of the magnetic disk 16 and the slider 31 by rotation of the magnetic disk 16. The direction of the airflow B is coincident with a rotating direction of the magnetic disk 16.

Figure 3:
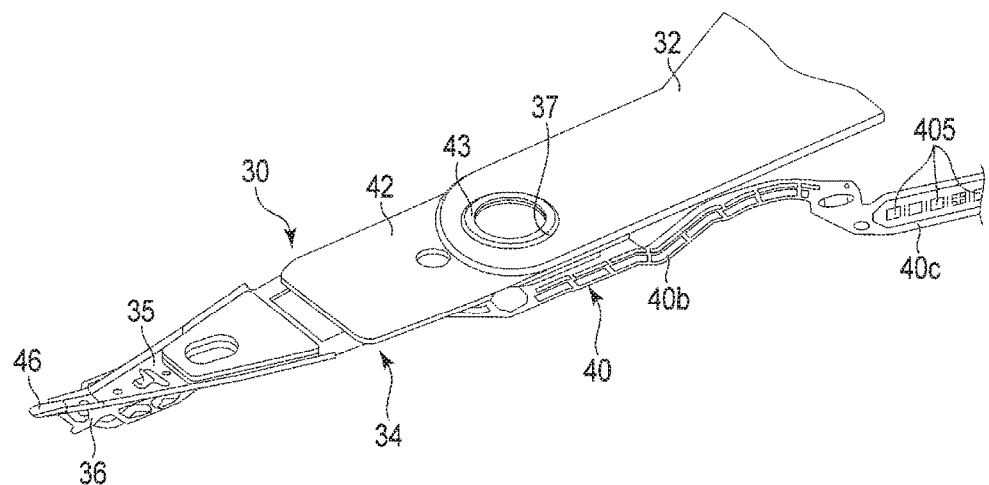
FIG. 3 is a perspective view of a head suspension assembly of the HDD.

Next, the structure of a suspension assembly 30 will be explained in detail. FIG. 3 is a perspective view of the suspension assembly, FIG. 4 is a perspective view of a magnetic head side of the head suspension assembly, and FIG. 5 is a perspective view of a base plate, a load beam and a lift tab of the suspension assembly.

Figure 4:
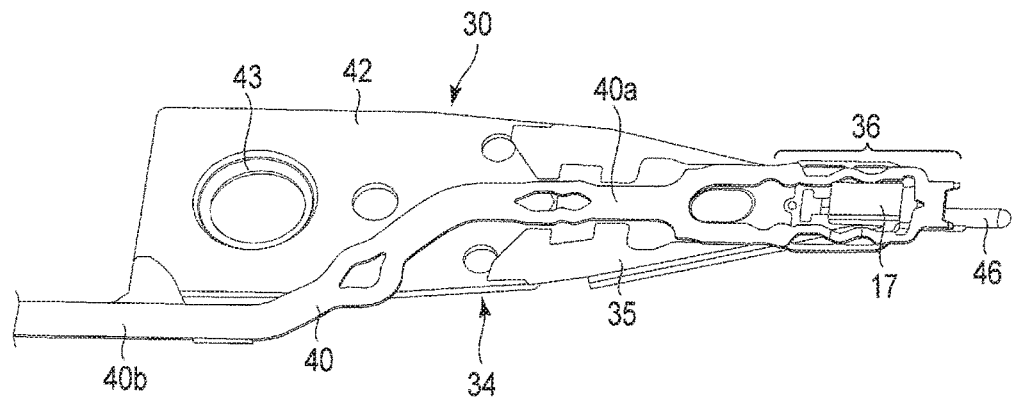
FIG. 4 is a perspective view of a magnetic head side of the head suspension assembly.
Figure 5:
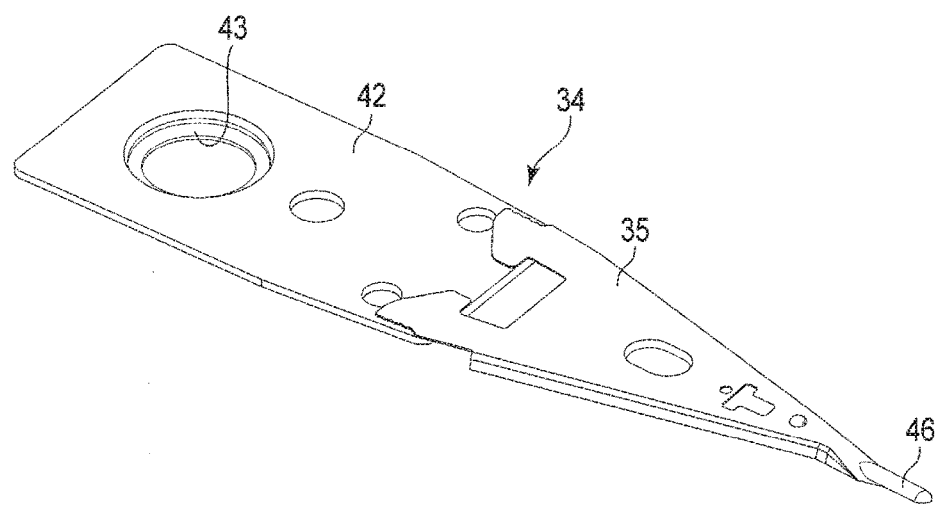
FIG. 5 is a perspective view of the head suspension assembly when the magnetic head and wiring members are removed.

As shown in FIGS. 1, 3 and 4, each suspension assembly 30 comprises a suspension 34 extending from the arm 32, and the magnetic head 17 supported on the extended end of the suspension 34. Note that the combination of the magnetic head 17 and a respective suspension assembly 30 will be called a head suspension assembly.

The suspension 34, which functions as a supporting plate, includes a rectangular base plate 42 formed of a metal plate having a thickness of several hundreds of micrometers, and a load beam 35 formed of a metal plate with a thickness of tens of micrometers in a shape of an elongate and thin leaf spring. The load beam 35 comprises a proximal end portion stacked on a distal end portion of the base plate 42, and is fixed to the base plate 42 by welding a plurality of portions of the load beam 35. An elongate and thin lift tab 46 is provided at the distal end of the load beam 35 in a protruding manner.

The base plate 42 includes, at a proximal-end portion thereof, a circular opening 42a, and annular protrusion 43 positioned around the opening 42a. By fitting the protrusion 43 of the base plate 42 in the circular caulking hole 37 formed at the distal end of the arm 32, and caulking the protrusion 43, the base plate 42 is fastened to the distal-end portion of the arm 32. The distal end of the base plate 42 may be fixed to the distal end of the arm 32 by laser welding, spot welding or adhesion.

The suspension assembly includes a slender belt-shaped flexure (wiring member) 40. As shown in FIGS. 3 and 4, the flexure 40 comprises a distal end portion 40a attached to upper surfaces of the load beam 35 and the base plate 42, and a posterior-half portion (extension portion) 40b extending outwards from a side edge of the base plate 42 and along a side edge of the arm 32. Further, the flexure 40 comprises a connecting end portion 40c which is located at a distal end of the extension portion 40b and comprises a plurality of connection pads 40f, which are connected to a relay FPC 21b (see FIG. 1) of the board unit 21.

The distal end portion of the flexure 40, which is located on the distal end portion of the load beam 35, forms the gimbal portion 36 functioning as an elastic supporting member. The magnetic head 17 is mounted and fixed onto the gimbal portion 36, and thus supported on the load beam 35 through the gimbal portion 36. Further, the magnetic head 17 is electrically connected to a plurality of wiring liens (not shown) of the flexure 40.

Figure 6:
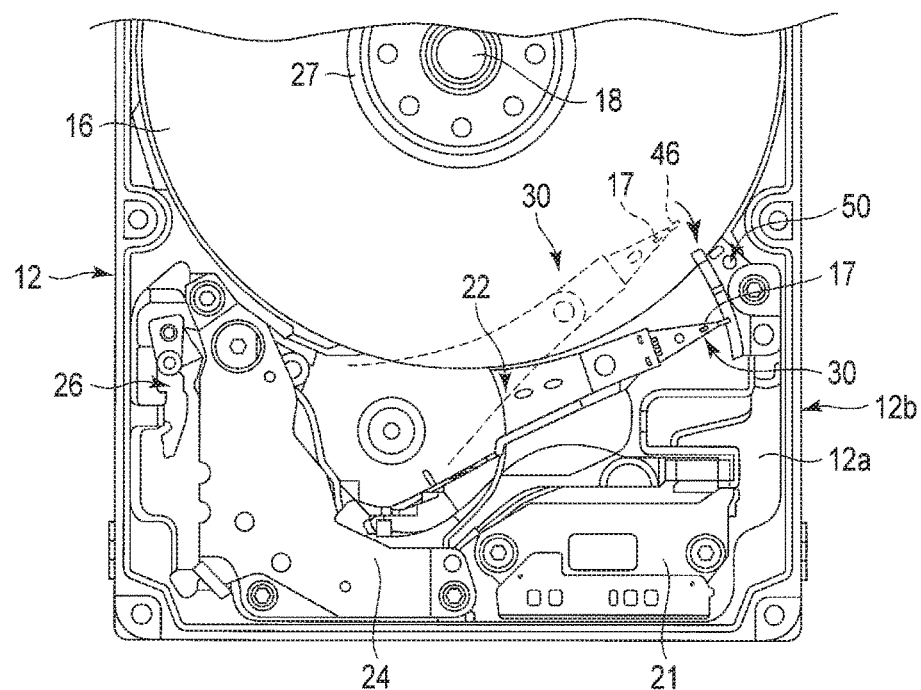
FIG. 6 is a plan view showing a part of the HDD.
Figure 7:
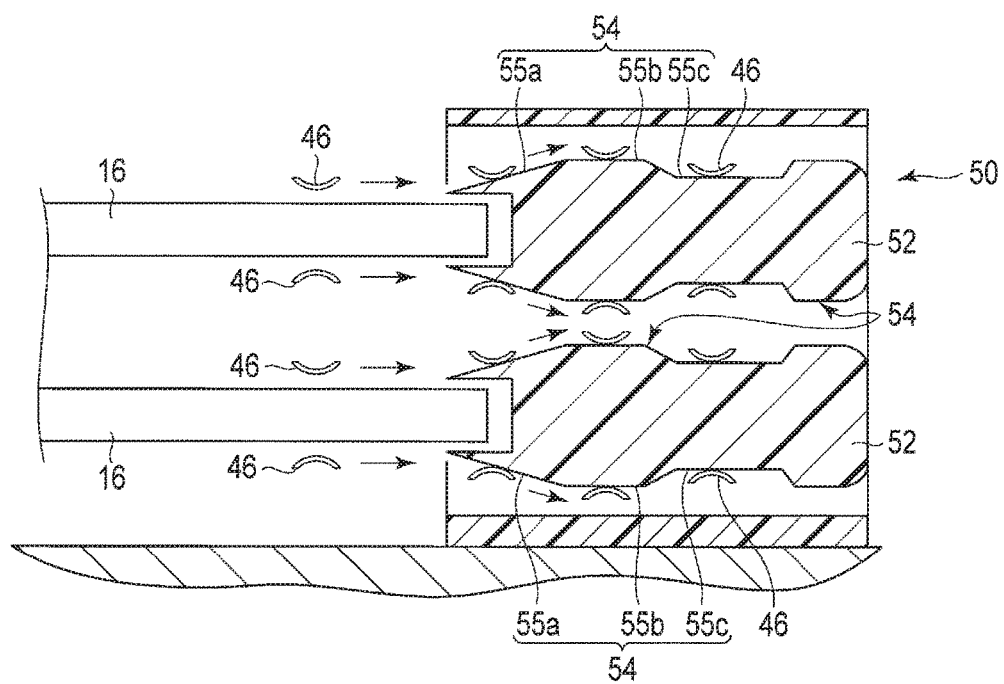
FIG. 7 is a diagram schematically showing a ramp and a lift tab of the HDD.
Figure 7:
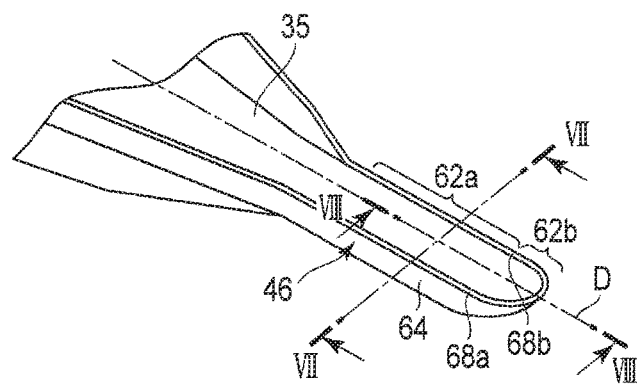

The lift tab 46 of the suspension assembly 30 constitutes, together with the ramp member 50 provided in the housing 12, a support mechanism which supports the magnetic head 17 in the retreat position separated from the respective magnetic disk 16. FIG. 6 is a plan view showing a part of the HDD, FIG. 7 is a cross section schematically showing the ramp member 50 and the magnetic disk 16. As shown in FIGS. 6 and 7, the ramp member 50 is provided on the bottom wall 12a of the housing 12 near the outer circumferential edge of the magnetic disk 16. The ramp member 50 includes a plurality of, for example, two ramp blocks 52.

Each of the ramp blocks 52 includes a supporting surface (parking surface) 54 for holding the magnetic head 17 in the unload or retreat position with respect to the magnetic disk 16. The supporting surface 54 includes an inclined portion 55*a* extending and inclining in a direction separating from the surface of the magnetic disk 16, a flat portion 55*b* continuing from the inclined portion 55*a* and a holder portion 55*c* made of a recess, from the vicinity of the outer circumferential edge of the magnetic disk 16.

As shown in FIGS. 6 and 7, when the suspension assembly 30 moves to the outer circumferential edge of the magnetic disk 16 from an operation position on the magnetic disk 16, the lift tab 46 of each suspension assembly 30 is engaged with the supporting surface 54 of the ramp block 52, and it slides on the supporting surface 54. As sliding along the inclined portion 55*a*, the lift tab 46 is pulled up in the direction separated from the surface of the magnetic disk 16. Then, the tab passes through the flat portion 55*b* and further reaches the holder portion 55*c*. The lift tab 46 is stopped and held at the holder portion 55*c*. In accordance with the pulling up and stopping of the lift tab 46, the magnetic head 17 is pulled up from the surface of the magnetic disk 16 and is then held in the retreat position on an outer side of the magnetic disk 16.

Next, a structure example of the lift tab 46 will be described in detail. FIG. 8 is an enlarged perspective view of the lift tab, FIG. 9 is a cross sectional view of the lift tab taken along line VII-VII of FIG. 8, and FIG. 10 is a longitudinal sectional view of the lift tab taken along line VIII-VIII of FIG. 8.

As shown in FIG. 8, the lift tab 46 extends in the direction of the central axis D from the tip of the load beam 35. The lift tab 46 includes an engaging portion 62*a* extending from the load beam 35 and formed into substantially a trough shape, and a hemisphere-shaped distal end portion 62*b* extending from the engaging portion 62*a* to a tip, integrally as one unit. The engaging portion 62*a* has an arc shape in its cross section which crosses the central axis D at right angles.

Figure 9:
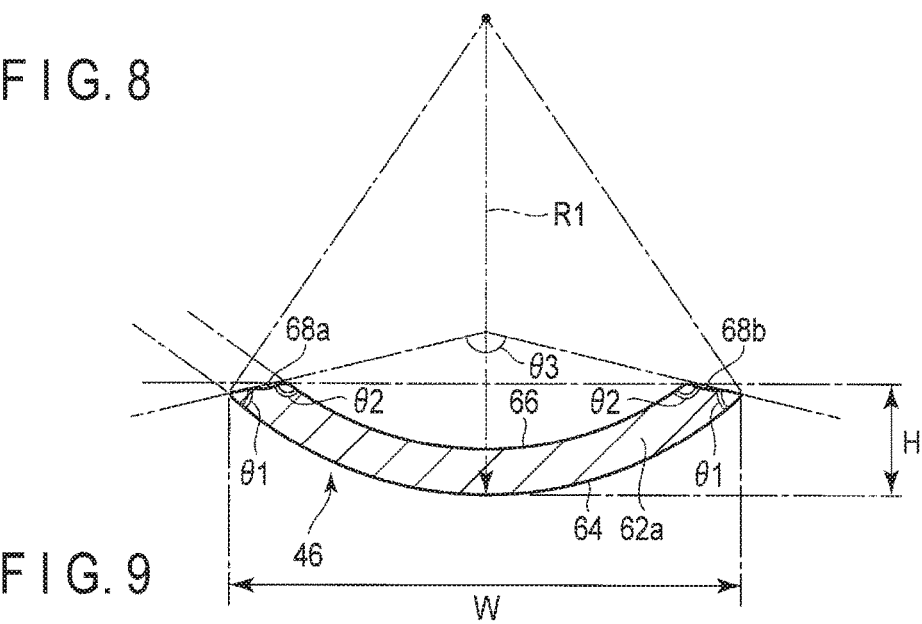
FIG. 9 is a cross sectional view of the lift tab taken along line VII-VII in FIG. 6.
Figure 10:
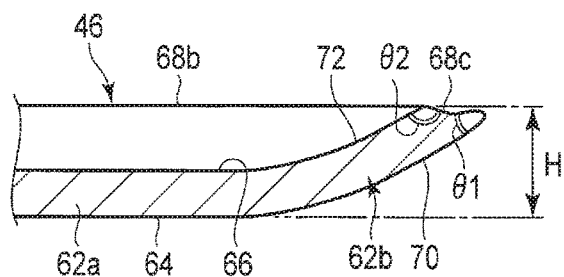
FIG. 10 is a cross sectional view of the lift tab taken along line VIII-VIII in FIG. 6.

That is, as shown in FIG. 9, the engaging portion 62*a* of the lift tab 46 comprises a circular outer circumferential surface 64 for engaging with the supporting surface 54 of the ramp member 50, a circular inner circumferential surface 66, a first upper end surface 68*a* located between one arc end of the outer circumferential surface 64 and one arc end of the inner circumferential surface 66, a second upper end surface 68*b* located between the other arc end of the outer circumferential surface 64 and the other arc end of the inner circumferential surface 66. In this embodiment, the outer circumferential surface 64 has a constant radius of curvature R1 over a full width of the engaging portion 62*a*.

In both the arc ends, that is, the side edges of the outer circumferential surface 64, a first angle θ1 made between the outer circumferential surface 64 and the first upper end surface 68*a* and a first (fourth) angle θ1 made between the outer circumferential surface 64 and the second upper end surface 68*a* are respectively less than a second angle θ2 made between the inner circumferential surface 66 and the first upper end surface 68*a* and a second (fifth) angle θ2 of the inner circumferential surface 66 and the second upper end surface 68*b* in both the arc ends of the inner circumferential surface 66. The first angle θ1 is less than 90 degrees, whereas the second angle θ2 is greater than 90 degrees. For example, the first angle θ1 is about 52 degrees, whereas the second angle θ2 is about 128 degrees.

The first upper end surface 68*a* and the second upper end surface 68*b* are formed so that the third angle θ3 made therebetween is, for example, 140 to 180 degrees, or preferably, 160 to 180 degrees. Or more preferably, the third angle θ3 should be 180 degrees, in which the first upper end surface 68*a* and the second upper end surface 68*b* are located substantially in the same plane.

If the gap between one arc end and the other arc end of the outer circumferential surface 64 is defined as a width W of the lift tab 46, and the gap between an arc end of the inner circumference side 66 and the top portion of the outer circumferential surface 64 is defined as a height H of the lift tab 46, the lift tab 46 should desirably be formed so that the ratio (W/H) of the width W to height H becomes 4.1 or more.

For example, when the plate thickness of the lift tab 46 is 30.5 μm, the width W=0.3392 mm, the height H=0.074 mm, and the ratio (W/H)=4.58 and the radius R1 of curvature=0.25 mm.

As shown in FIG. 10, the distal end portion 62*b* of the lift tab 62 is formed to have an arc shape in its cross section in the central axis D, which is continuous to the engaging portion 62*a*, as in the case of the engaging portion 62*a* described above. That is, the distal end portion 62*b* includes an arc outer circumferential surface 70, an arc inner circumference side 72 and a third upper end surface 68*c* located between an arc end of the outer circumferential surface 70 and an arc end of the inner circumference side 72. The third upper end surface 68*c* is connected continuously to the first upper end surface 68*a* and the second upper end surface 68*b* of the engaging portion 62*a* described above. In this embodiment, the outer circumferential surface 70 has a constant radius of curvature.

In the arc end of the outer circumferential surface 70, a first angle θ1 made between the outer circumferential surface 70 and the third upper end surface 68*c* is less than a second angle θ2 made between the inner circumference side 72 and the third upper end surface 68*c* in the arc end of the inner circumference side 72. The first angle θ1 is set to less than 90 degrees, whereas the second angle θ2 is set to greater than 90 degrees. For example, the first angle θ1 is at to about 52 degrees and the second angle θ2 is set to about 128 degrees.

The lift tab 46 constituted as above can be manufactured by the following manufacturing method. FIGS. 11 and 12 are sectional views each showing a step of manufacturing the lift tab, and FIG. 13 is a sectional view showing a bending step for the lift tab. In this embodiment, the coining is used as an example of the bending process.

As shown in FIG. 11, a flat metal plate, for example, a stainless plate, having a plate thickness T of tens of μm is prepared as the base material 80 for forming a load beam and a lift tab. A first mask 82*a* of a desired shape is formed on a first surface 80*a* of the base material 80 and a second mask 82*b* of a desired shape is formed on a second surface 80*b* of the base material 80 to be disposed to oppose the first mask 82*a*. Here, the second mask 82*b* is formed in dimensions smaller than those of the first mask 82*a* and disposed at such a location that the side edges of the second mask 82*b* are deviated inward with respect to the respective side edges of the first mask 82*a* by a width (gap width) W2, which is less than the plate thickness T.

Subsequently, as shown in FIG. 12, the base material 80 is etched from both surface sides through the first mask 82*a* and the second mask 82*b*, to be cut out into a desired shape to meet the first mask 82*a*. Here, the side edges of the second mask 82*a* are deviated only by the width W2, and therefore the side edges of the base material 80 (equivalent to the upper end surfaces of the lift tab) is etched into such a shape inclined toward the side edges of the second mask 82*b* from the respective side edges of the first mask 82*a* with respect to a direction perpendicular to the surface of the base material 80. That is, the base material 80 is formed into such a shape that the corner portions on the second mask 82b side are scraped off.

After the etching, the first and second masks 82a and 82b are removed. Then, as shown in FIG. 13, the base material 80 is placed between a convex metallic mold 84 having a circular convex surface 84a and a concave metallic mold 86 having a circular concave surface 86a, and the base material 80 is subjected to a coining process (pressing process) to be shaped into a desired arc shape by the convex and concave metallic molds 84 and 86. Thus, the load beam including a lift tab as one unit is obtained.

In the embodiment, the base material 80 having a plate thickness T of 30.5 μm is subjected to coining process so that the gap width W2 between the first mask 82a and the second mask 82b is sets to 20 μm, which is less than the plate thickness T, and the radius of curvature R1 is set to 0.25 mm. In this manner, the etching surfaces (the first upper end surface and the second upper end surface) of the lift tab can be set substantially parallel (the third angle θ3=160 degree) to a horizontal surface. Thus, the height H of the lift tab 46 can be lowered as compared to the case where the first mask 82a and the second mask 82b of the same dimensions are used for the processing.

Figure 14:
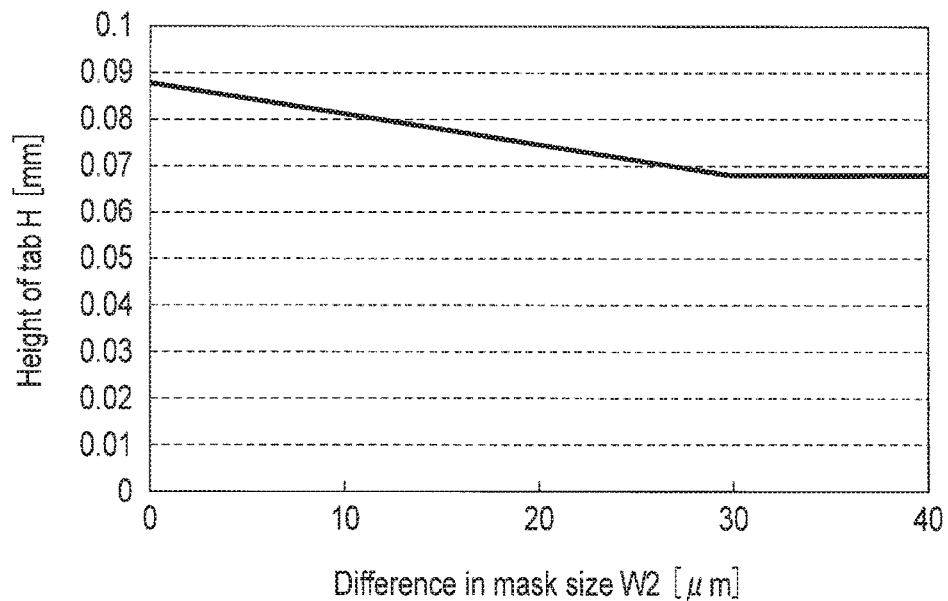
FIG. 14 is a diagram showing the relationship between a difference in mask size (gap width W2) and a height H of the lift tab.

FIG. 14 shows the relationship between the gap width W2 of the mask side edges and the height H of the lift tab when the plate thickness T of the base material is set to 30.5 μm and the coining radius (the radius of curvature R1) is set to 0.25 mm. As shown in FIG. 14, as the gap width W2 is greater, the amount of the inner corner portions of the lift tab scraped off is increased, and therefore the height H of the lift tab is decreased. When the gap width W is set to 30 μm, the height H is at the minimum. However, if the gap width W2 reaches a predetermined value (30 μm or more in FIG. 14), the side surfaces becomes high rather than the inner diameter of the lift tab, and therefore the height H of the lift tab is no longer decreased. Moreover, as the gap width W2 is greater, the angle θ1 becomes smaller and therefore the rigidity of the edge of the lift tab lowers. Furthermore, due to the dispersion of the etching amount during the manufacture, the ridgeline of the edge of the lift tab is not stabilized to become wavy or sawtooth-like. This tendency is prominent particularly when the plate thickness of the base material is around 30.5 μm or less.

Therefore, the gap width W2 is desirably set less than or equal to the plate thickness T of the base material 80, for example, ½ to ⅔ of the plate thickness T. In this embodiment, the gap width W2 is set to, for example, ⅔ of the plate thickness T, that is, about 20 μm (0.02 mm). Note that the sectional shape, the ratio between the height and width and the like of the lift tab according to this embodiment may be applied to the entire lift tab or a portion thereof.

According to this embodiment, it is possible to provide a suspension assembly comprising a lift tab which includes an outer circumferential surface to be engaged with the ramp, having a sufficient length in the circumferential direction and which is low in height, and an HDD comprising such a suspension assembly. By using the lift tab low in height, the height of the ramp can be decreased, or the gaps between the magnetic disks can be decreased. Thus, it is possible to downsize and thin the HDD as a whole, and increase the number of platters.

Figures 15A, 15B:
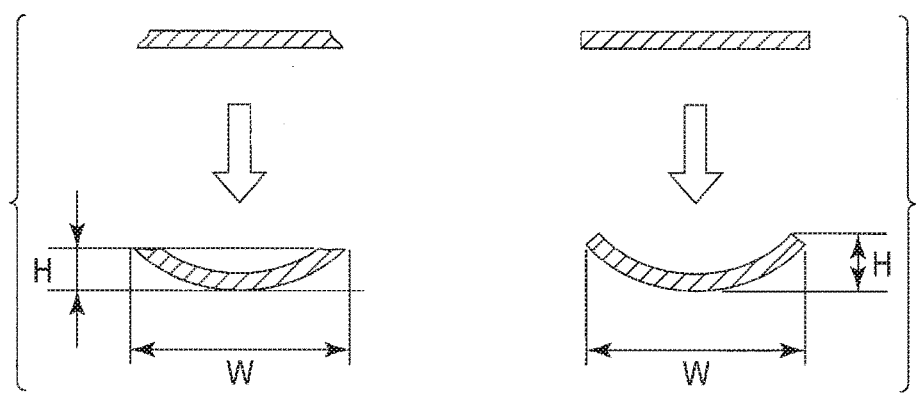
FIG. 15A is a cross sectional view showing a base material of the lift tab and the processed lift tab according to this embodiment.
FIG. 15B is a cross sectional view showing a base material of a lift tab and a processed lift tab according to a comparative example.

FIG. 15A shows sectional shapes of the base material and the lift tab according to this embodiment, and FIG. 15B shows sectional shapes of a base material and a lift tab according to a comparative example. In the lift tab of the comparative example, both side surfaces (upper end surfaces) of the base material are formed at right angles without inclining with respect to the first surface or the second surface, and the upper end surfaces of the lift tab after processing also extends at right angles with respect to the outer circumferential surface and the inner circumferential surface.

Lift tabs according to this embodiment and those of the comparative example with various dimensions were prepared, and the width W and height H of each lift tab obtained when, for example, the plate thickness T was set to 0.0305 mm and the gap width W2 was set 0.02 mm were compared as specified below.

1) When the width W is common:

Embodiment

H: 0.0740 mm, W: 0.3392 mm, Radius R1: 0.25 mm, Ratio (W/H): 4.58

Comparative Example

H: 0.887 mm, W: 0.3392 mm, Radius R1: 0.25 mm, Ratio (W/H): 3.82

2) When the height H is common:

Embodiment

H: 0.0740 mm, W: 0.3392 mm, Radius R1: 0.25 mm, Ratio (W/H): 4.58

Comparative Example

H: 0.0740 mm, W: 0.2988 mm, Radius R1: 0.25 mm, Ratio (W/H): 4.04

3) When the width W is common (R1: 0.15):

Embodiment

H: 0.0740 mm, W: 0.258 mm, Radius R1: 0.15 mm, Ratio (W/H): 3.49

Comparative Example

H: 0.089 mm, W: 0.258 mm, Radius R1: 0.15 mm, Ratio (W/H): 2.90

4) When the width W is common (R1: 0.20):

Embodiment

H: 0.0740 mm, W: 0.301 mm, Radius R1: 0.20 mm, Ratio (W/H): 4.07

Comparative Example

H: 0.089 mm, W: 0.301 mm, Radius R1: 0.20 mm, Ratio (W/H): 3.38

5) When the width W is common (R1: 0.30):

Embodiment

H: 0.0740 mm, W: 0.3726 mm, Radius R1: 0.30 mm, Ratio (W/H): 5.04

Comparative Example

H: 0.089 mm, W: 0.3726 mm, Radius R1: 0.30 mm, Ratio (W/H): 4.20

6) When the width W is common (R1: 0.35):

Embodiment

H: 0.0740 mm, W: 0.403 mm, Radius R1: 0.35 mm, Ratio (W/H): 5.45

Comparative Example

H: 0.089 mm, W: 0.403 mm, Radius R1: 0.35 mm, Ratio (W/H): 4.54

As indicated above, in any of Cases 1 to 6, the ratio (width/height) was higher in the lift tab of the embodiment than that of the comparative example. Therefore, it can be understood that a lift tab low in height can be obtained in the embodiment as compared to the comparative example.

Next, a method of manufacturing a lift tab according to another embodiment will now be described.

In the embodiment described above, both end surfaces of the base material 80 were inclined by etching using masks, but the embodiment is not limited to this. For example, a method of crushing corner portions (edges) of the base material 80 by pressing may be used as well.

Figure 16:
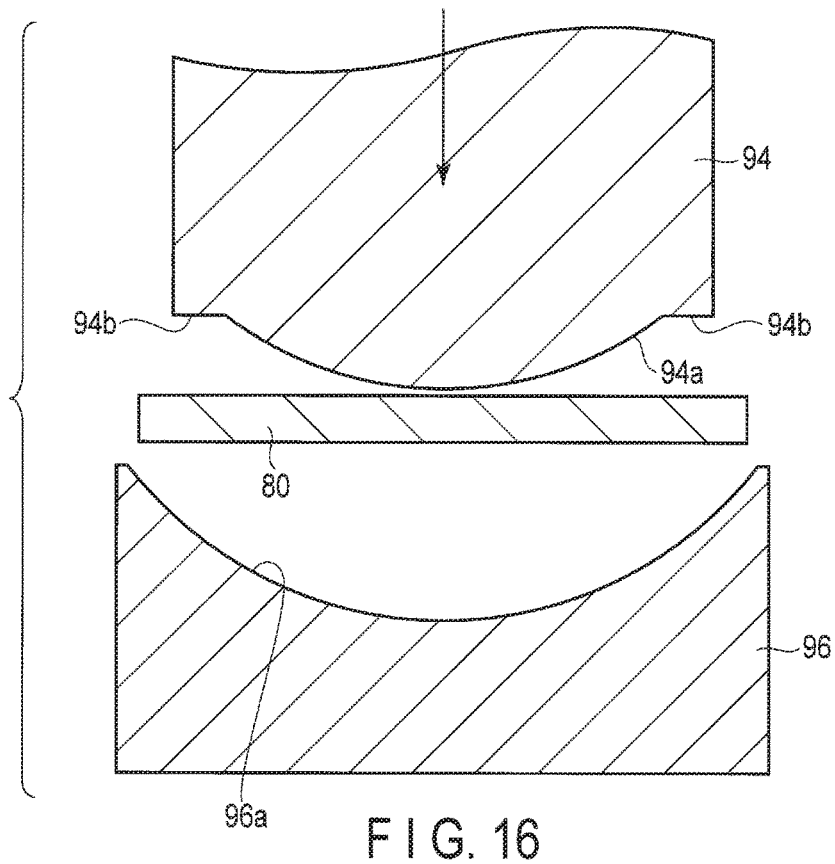
FIG. 16 is a cross sectional view showing a processing tool used for being and pressing of a lift tab, and a base material before processing according to another embodiment.
Figure 17:
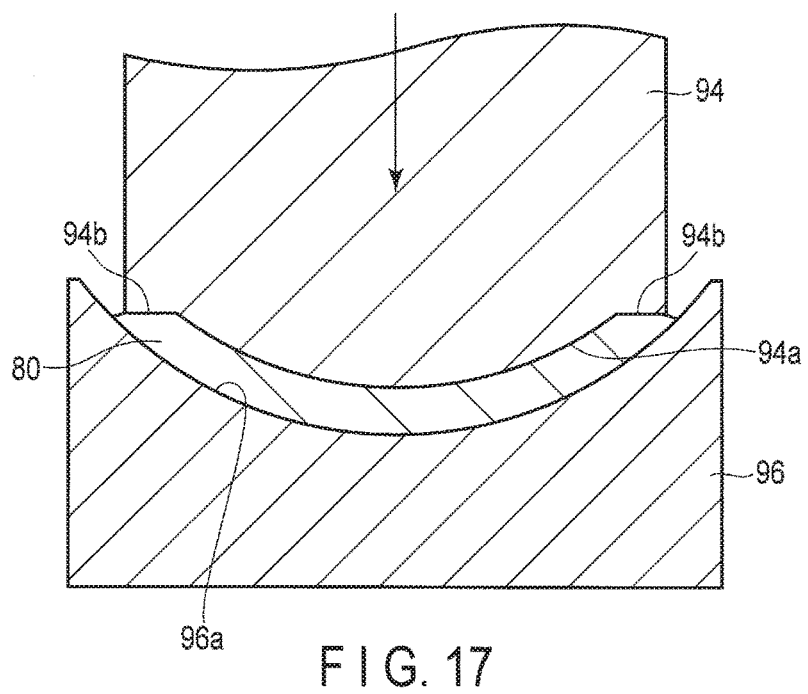
FIG. 17 is a cross sectional view showing the processing tool and the processed lift tab according to another embodiment after the bending and pressing process.

FIG. 16 shows sections of a metallic mold (processing tool) used for pressing and bending, and a base material before processing according to another embodiment and FIG. 17 shows cross sections of the metallic mold and the base material in a bending state.

As shown in FIG. 16, the processing tool includes a convex metallic mold 94 with a circular convex surface 94a and a concave metallic mold 96 with a circular concave surface 96a. Further, the convex metallic mold 94 is located on both sides of the convex surface 94a and comprises a pair of flat pressing shoulder portions 94b each extending substantially horizontally.

The base material 80 is placed between the convex metallic mold 94 and the concave metallic mold 96 while both end surfaces (both side surfaces) of the base material 80 is still in an unprocessed state. Then, as shown in FIGS. 16 and 17, one of the metallic molds, for example, the convex metallic mold 94 is pressed against the other one, the concave metallic mold 96, and thus the base material 80 is subjected to the coining process (bending process) into a desired arc shape by the convex metallic mold 94 and the concave metallic mold 96. At the same time, both inner circumferential corner portions (both edges) of the base material 80 are crushed by the pair of press shoulder portions 94b, to form a pair of substantially horizontal edge surfaces. In this manner, the end surfaces (the first upper end surface and the second upper end surface) of the lift tab can be formed parallel to the horizontal plane (the third angle θ3=180 degrees).

According to sill another embodiment, the corner portions (edges) of the base material 80 may be crushed at once when forming a lift tab by bending, or the corner portions (edges) of the base material 80 may be crushed with a separate flat metallic mold after forming a circular lift tab by bending.

With these manufacturing methods of the other embodiments discussed above, a lift tab exhibiting an advantageous effect similar to that of the first embodiment can be manufactured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the size of the magnetic disks is not limited to 2.5 inches, but may be some other size. The number of magnetic disks is not limited to two, but may be one, three or more, in which case, the number of suspension assemblies may be decreased or increased according to the number of magnetic disks. The material and the dimensions of the suspension assembly are not limited to those of the embodiments discussed above, but may be changed variously as needed.

What is claimed is:

1. A suspension assembly for a disk drive, comprising:
a support plate including a distal end; and
a lift tab extending in a first direction from the distal end of the support plate,
wherein
the lift tab is formed to have an arc-shaped lateral cross section orthogonally crossing the first direction, and comprises an arc-shaped outer circumferential surface, an arc-shaped inner circumferential surface, a first upper end surface located between one arc end of the outer circumferential surface and one arc end of the inner circumferential surface, and a second upper end surface located between an other arc end of the outer circumferential surface and an other arc end of the inner circumferential surface, and
a first angle made between the outer circumferential surface and the first upper end surface is less than a second angle made between the inner circumferential surface and the first upper end surface.

2. The suspension of claim 1, wherein
a third angle made between the first upper end surface and the second upper end surface is 140 to 180 degrees.

3. The suspension assembly of claim 1, wherein
the outer circumferential surface of the lift tab has a constant radius of curvature.

4. The suspension assembly of claim 1, wherein
when a gap between the one arc end and the other arc end of the outer circumferential surface is defined as a width of the lift tab, and a gap between a plane where the first upper end surface and the second upper end surface are located and a top portion of the outer circumferential surface is defined as a height of the lift tab, a ratio between the width and the height (width/height) is 4.1 or more.

5. The suspension assembly of claim 1, wherein
a forth angle made between the outer circumferential surface and the second upper end surface is less than a fifth angle made between the inner circumferential surface and the second upper end surface.

6. The suspension of claim 5, wherein
a third angle made between the first upper end surface and the second upper end surface is 140 to 180 degrees.

7. A disk device comprising:
a disk shaped recording medium comprising a recording layer;
a suspension assembly comprising a support plate including a distal end, and a lift tab extending in a first direction from the distal end of the support plate;
a magnetic head supported by the support plate of the suspension assembly; and a ramp member provided on an outer side of the recording medium, to which the lift tab of the suspension assembly is abuttable;

wherein the lift tab is formed to have an arc-shaped lateral cross section orthogonally crossing the first direction, and comprises an arc-shaped outer circumferential surface, an arc-shaped inner circumferential surface, a first upper end surface located between one arc end of the outer circumferential surface and one arc end of the inner circumferential surface, and a second upper end surface located between an other arc end of the outer circumferential surface and an other arc end of the inner circumferential surface, and a first angle made between the outer circumferential surface and the first upper end surface is less than a second angle made between the inner circumferential surface and the first upper end surface.

8. The disk device of claim 7, wherein a third angle between the first upper end surface and the second upper end surface is 140 to 180 degrees.

9. The disk device of claim 7, wherein the outer circumferential surface of the lift tab has a constant radius of curvature.

10. The disk device of claim 7, wherein when a gap between the one arc end and the other arc end of the outer circumferential surface is defined as a width of the lift tab, and a gap between a plane where the first upper end surface and the second upper end surface are located and a top portion of the outer circumferential surface is defined as a height of the lift tab, a ratio between the width and the height (width/height) is 4.1 or more.

* * * * *